(12) United States Patent
Wato et al.

(10) Patent No.: US 7,497,465 B2
(45) Date of Patent: Mar. 3, 2009

(54) CAPACITANCE TYPE SENSOR AND OCCUPANT DETECTION SYSTEM HAVING THE SAME

(75) Inventors: Koji Wato, Obu (JP); Akinori Jitsui, Okazaki (JP); Tsutomu Kamizono, Nagoya (JP); Masahiro Taguchi, Hazu-gun (JP); Hiroyuki Ito, Chita (JP); Shingo Wanami, Kariya (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 11/151,662

(22) Filed: Jun. 14, 2005

(65) Prior Publication Data
US 2005/0275202 A1 Dec. 15, 2005

(30) Foreign Application Priority Data
Jun. 14, 2004 (JP) .............................. 2004-175396
Jan. 24, 2005 (JP) .............................. 2005-015736

(51) Int. Cl.
*B60K 28/04* (2006.01)
(52) U.S. Cl. ...................... 280/735; 180/273; 340/604; 340/667
(58) Field of Classification Search ................. 280/735; 180/271, 273; 340/603–605, 666, 667
See application file for complete search history.

(56) References Cited

U.S. PATENT DOCUMENTS

| | | | |
|---|---|---|---|
| 5,618,056 A | 4/1997 | Schoos et al. | |
| 5,851,026 A | 12/1998 | Schoos et al. | |
| 5,987,370 A | 11/1999 | Murphy et al. | |
| 6,043,743 A * | 3/2000 | Saito et al. | 340/562 |
| 6,058,341 A | 5/2000 | Myers et al. | |
| 6,101,436 A | 8/2000 | Fortune et al. | |
| 6,138,067 A | 10/2000 | Cobb et al. | |
| 6,283,504 B1 | 9/2001 | Stanley et al. | |
| 6,348,862 B1 | 2/2002 | McDonnell et al. | |
| 6,378,900 B1 | 4/2002 | Stanley et al. | |
| 6,392,542 B1 | 5/2002 | Stanley | |
| 6,445,294 B1 | 9/2002 | McDonnell et al. | |
| 6,490,936 B1 | 12/2002 | Fortune et al. | |
| 6,517,106 B1 | 2/2003 | Stanley et al. | |
| 6,520,535 B1 | 2/2003 | Stanley et al. | |

(Continued)

FOREIGN PATENT DOCUMENTS

EP 0 990 565 A1 4/2000

(Continued)

*Primary Examiner*—Paul N. Dickson
*Assistant Examiner*—Drew J. Brown
(74) *Attorney, Agent, or Firm*—Posz Law Group, PLC

(57) ABSTRACT

A capacitance type sensor installed in a vehicle includes the first electrode, the second electrode, and the third electrode. The first electrode is arranged inside a seating portion of a seat or a backrest portion of the seat, or both. The second electrode is arranged adjacent to the first electrode inside at least one of the seating portion and the backrest portion of the seat, whatever the first electrode is arranged. The second electrode forms an electric field together with the first electrode between them in a wetness determination mode in which a wet condition of the seat is determined. The third electrode forms an electric field together with the first and the second electrode between them in an occupant determination mode in which an occupant in the seat is determined.

17 Claims, 16 Drawing Sheets

U.S. PATENT DOCUMENTS

| | | |
|---|---|---|
| 6,563,231 B1 | 5/2003 | Stanley et al. |
| 6,577,023 B1 | 6/2003 | Stanley et al. |
| 6,598,900 B2 | 7/2003 | Stanley et al. |
| 6,825,765 B2 | 11/2004 | Stanley et al. |
| 2001/0045733 A1 | 11/2001 | Stanley et al. |
| 2003/0090376 A1* | 5/2003 | Thompson et al. .......... 340/541 |
| 2004/0111201 A1* | 6/2004 | Thompson et al. ............ 701/45 |
| 2006/0092032 A1* | 5/2006 | Manlove et al .............. 340/667 |

FOREIGN PATENT DOCUMENTS

| | | |
|---|---|---|
| JP | A-07-78539 | 3/1995 |
| JP | A-11-271463 | 10/1999 |
| JP | A-2000-296757 | 10/2000 |
| JP | A-2002-36929 | 2/2002 |
| JP | A-2002-221579 | 8/2002 |

* cited by examiner

CAPACITANCE TYPE SENSOR AND OCCUPANT DETECTION SYSTEM HAVING THE SAME

CROSS REFERENCE TO RELATED APPLICATION

This application is based on and incorporates herein by reference Japanese Patent Applications No. 2004-175396 filed on Jun. 14, 2004 and No. 2005-15736 filed on Jan. 24, 2005.

FIELD OF THE INVENTION

The present invention relates to a capacitance type sensor and an occupant detection system having the capacitance type sensor.

BACKGROUND OF THE INVENTION

An occupant detection system including a capacitance type sensor and an occupant detection electronic control unit (ECU) is proposed in JP-A-11-271463. The capacitance type sensor outputs current or voltage signals indicating distortions of a weak electric field occurs around electrodes. In this system, a pair of electrodes are arranged in a seat. Only air is present between the electrodes when the seat is vacant. A child seat is present between the electrodes when it is mounted to the seat. A human body is between a person sits in the seat.

A specific inductive capacities of air, the child seat, and the human body are about 1, 2 to 5, and 50, respectively. The specific inductive capacity of the child seat depends on its material. The specific inductive capacities differ from each other, namely, capacitances between the electrodes differ from each other according to kinds of objects present between them.

The occupant detection ECU determines conditions of the seat based on the capacitance differences. Namely, it determines that the seat is vacant, equipped with a child seat, or occupied by an adult based on the capacitance differences. An air bag ECU determines permission or prohibition of air bag deployment based on the seat condition determined by the occupant detection ECU. It prohibits the air bag deployment when the seat is vacant or equipped with a child seat, and permits it when the seat is occupied by an adult.

A specific inductive capacity of water is about 80 and larger than that of the human body. Thus, it is difficult to distinguish between a condition in which the seat is occupied by an adult and a condition in which the seat is vacant when the seat is wet. An occupant detection system using a capacitance type sensor in combination with a weight sensor is proposed in JP-A-2003-520344 to improve the occupant detection accuracy in a condition that the seat is wet. For the same purpose, an occupant detection system using a capacitance sensor in combination with a weight sensor or a thickness sensor is proposed in JP-A-2002-36929. The weight sensors and the thickness sensor are less likely to be influenced by wetness in the seat. Therefore, the systems can determine whether the seat is wet. However, the system require additional sensors, that is, the weight sensors or the thickness sensor, and complexity and manufacturing cost of the systems increase.

An occupant detection system in which outputs of a capacitance type sensor are detected in chronological order is proposed in JP-A-2002-221579. The outputs vary differently in chronological order when a seat is occupied by an adult and when the seat is wet. This system determines whether the seat is wet based on the different chronological variation patterns. However, circuit configurations of an occupant detection ECU become complex.

SUMMARY OF THE INVENTION

The present invention therefore has an objective to provide a capacitance type sensor that detects wetness of a seat with a simple structure and an occupant detection system having the capacitance type sensor. A capacitance type sensor of the present invention includes a first electrode, a second electrode, and a third electrode. The first electrode is arranged inside any one of a seating portion and a backrest portion of a seat in a vehicle. The second electrode is arranged adjacent to the first electrode inside any one of the seating portion and the backrest portion of the seat, whichever the first electrode is arranged. The first electrode and the second electrode form an electric field between them in a wetness determination mode in which a wet condition of the seat is determined. The third electrode forms an electric field between the first and the second electrodes and itself in an occupant determination mode in which an occupant in the seat is determined.

The first and the second electrodes are arranged inside the seat rather than on a surface of the seat. Therefore, the human body is less likely to influence on the electric field between the first electrode and the second electrode. Some kind of influence appears in the electric field only when a water seeps into the inside of the seat. Whether the seat is wet can be determined based on a variation in the electric field formed between the first and the second electrodes.

The occupant detection system includes the capacitance type sensor and an occupant detection electronic control unit (ECU). The occupant detection ECU determines whether the seat is wet in the wetness determination mode, and determines that the seat is vacant, the seat is occupied by an adult, or the seat is occupied by a child with a child seat in the occupant determination mode. With this configuration, the occupant detection system does not require any additional sensor including a weight sensor and a thickness sensor. Thus, the structure of the occupant detection system is simple. Furthermore, chronological variations in the outputs of the capacitance type sensor are not required to be calculated. Thus, the circuit structure of the occupant detection ECU is simple.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
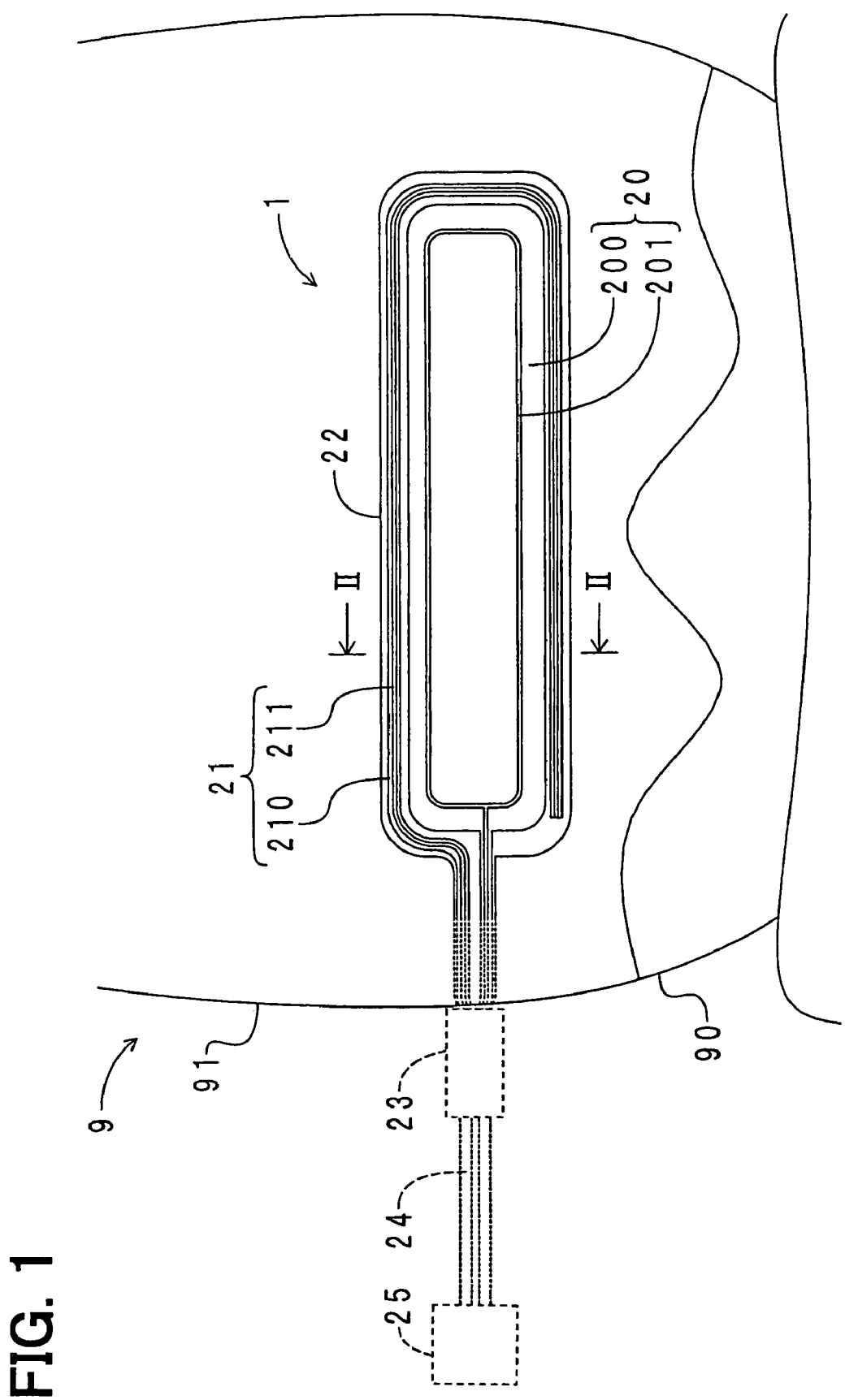
FIG. 1 is a top view of a capacitance type sensor according to the first embodiment of the present invention.

The preferred embodiments of the present invention will be explained with reference to the accompanying drawings. In the drawings, the same numerals are used for the same components and devices.

First Embodiment

Referring to FIGS. 1 through 4, a capacitance type sensor 1 includes the first electrode 20, the second electrode 21, a film 22, a sealed wire connector 23, sealed wires 24, and an external connector 25. The capacitance type sensor 1 is connected to a seat frame 26 that is used as a ground electrode of the capacitance type sensor 1.

Figure 2:
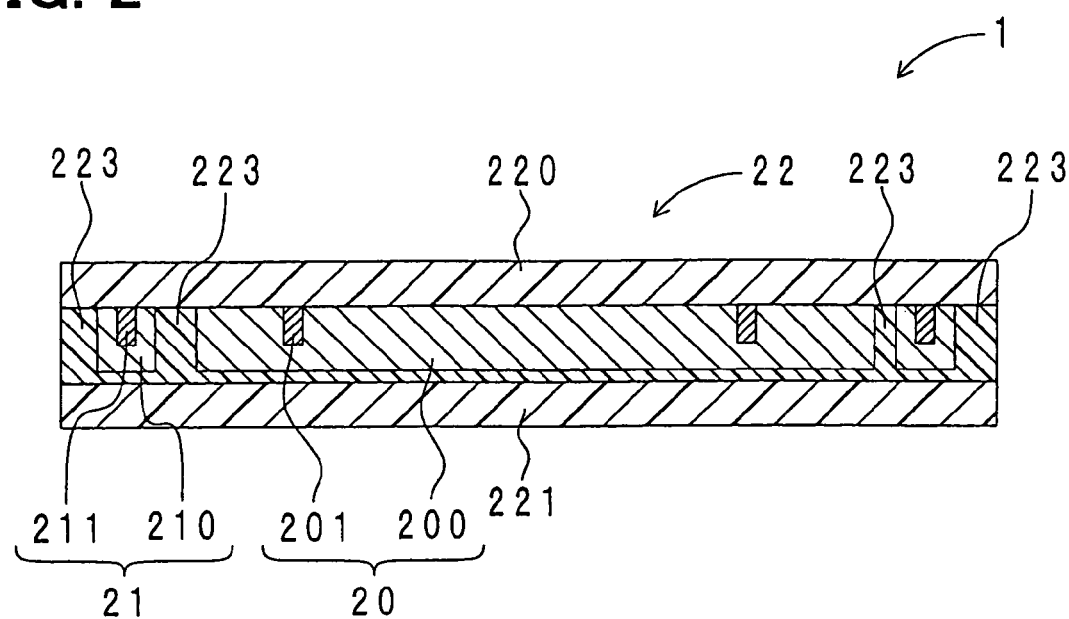
FIG. 2 is a cross-sectional view of the capacitance type sensor sectioned by the II-II line in FIG. 1 according to the first embodiment.
Figure 3:
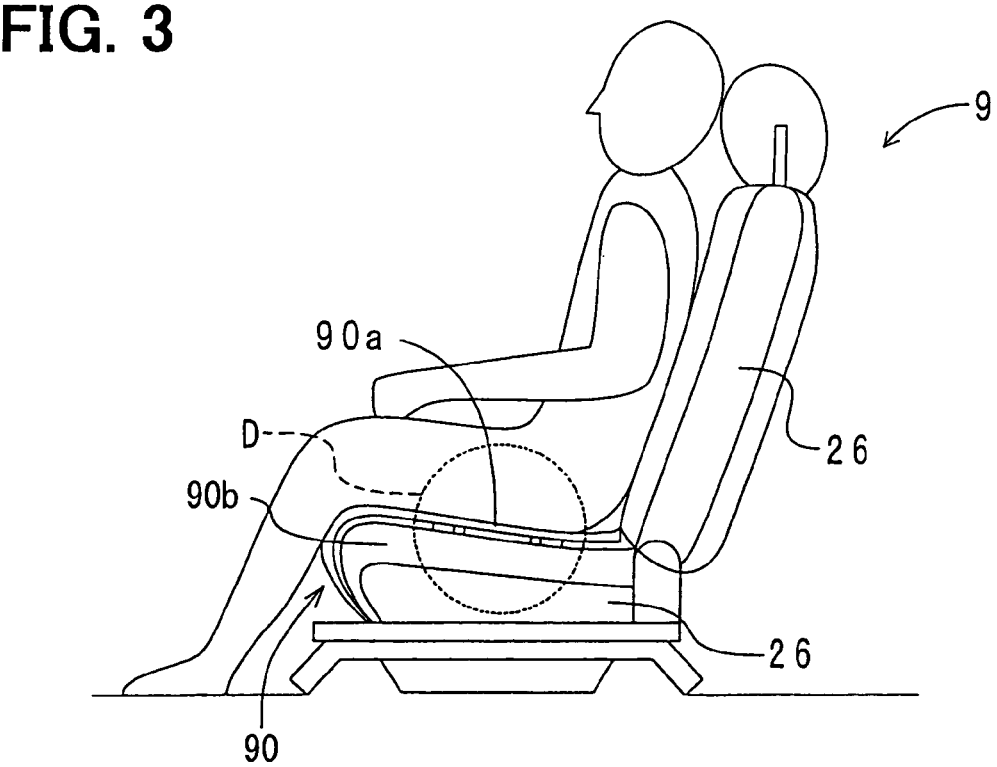
FIG. 3 is a side view of a seat in which the capacitance type sensor is arranged according to the first embodiment.
Figure 4:
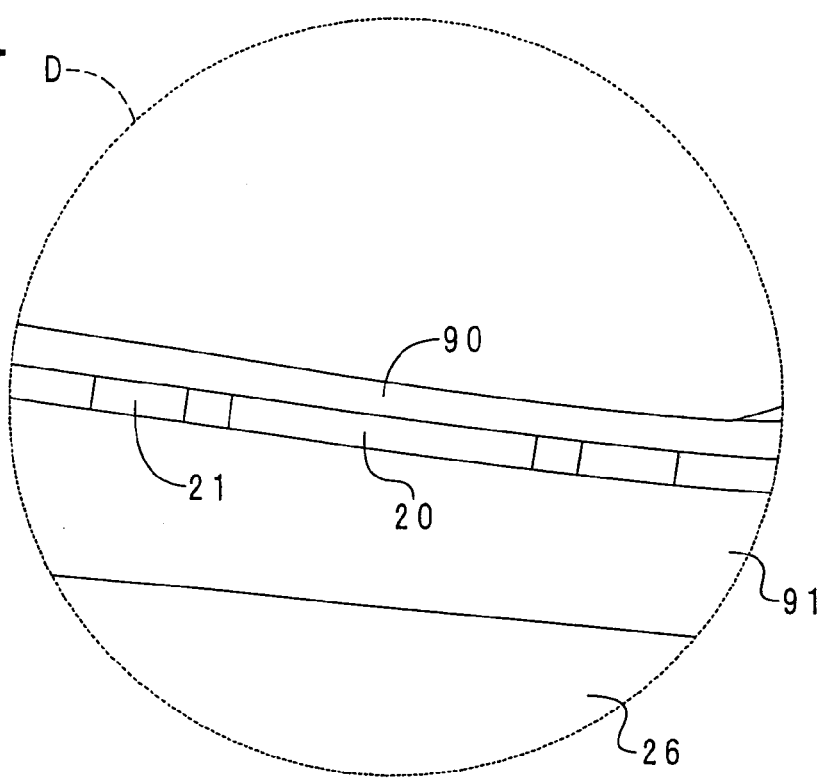
FIG. 4 is an enlarged sectional view of the seat indicated with a circle D in FIG. 3 according to the first embodiment.

In FIG. 1, portions of the capacitance type sensor 1 arranged behind a passenger seat 9 are indicated with dashed lines. In FIGS. 2 through 4, the film 22, the first electrode 20, and the second electrode 21 are exaggerated in the vertical direction. Silver portions of the first electrode 20 and the second electrode 21, and the film 22 are not shown in FIGS. 3 and 4.

A seating portion 90 of the passenger seat 9 includes a seat cover 90a and a seat cushion 90b. The film 22 is arranged between the seat cover 90a and the seat cushion 90b. The film 22 includes a upper film 220, a lower film 221, and an adhesive 223. The upper film 220 and the lower film 221 are made of polyethylene terephthalate (PET), and formed in rectangle. The upper film 220 is arranged on top of the lower film 221, and fixed to the lower film 221 with the adhesive 223.

The first electrode 20 has a carbon portion 200 and a silver portion 201. The first electrode 20 is arranged between the upper film 220 and the lower film 221, and about in the center of the film 22. The carbon portion 200 is formed in rectangle, and the silver portion 201 is formed in a rectangular frame. The silver portion 201 is arranged slightly inside outer edges of the carbon portion 200.

The second electrode 21 has a carbon portion 210 and a silver portion 211. The second electrode 21 is arranged between the upper film 220 and the lower film 221, and around the first electrode 20 on the outer side of the first electrode 20. The carbon portion 210 is formed with curves and encircles the first electrode 20. The silver portion 211 is arranged in a center of a width of the carbon portion 210 and in the longitudinal direction of the carbon electrode 210.

The sealed wire connector 23 and the external connector 25 are arranged on the rear side of the passenger seat 9. The first electrode 20 and the second electrode 21 are connected with the sealed wire connector 23 via a through hole (not shown) formed in the seat cushion 90b. The sealed wire connector 23 and the external connector 25 are connected with each other via the sealed wire 24. The external connector 25 is connected with an occupant detection ECU 3 (not shown in FIGS. 1-4). The seat frame 26 is a frame of the passenger seat 9, and it is grounded via a body of the vehicle.

Figure 5:
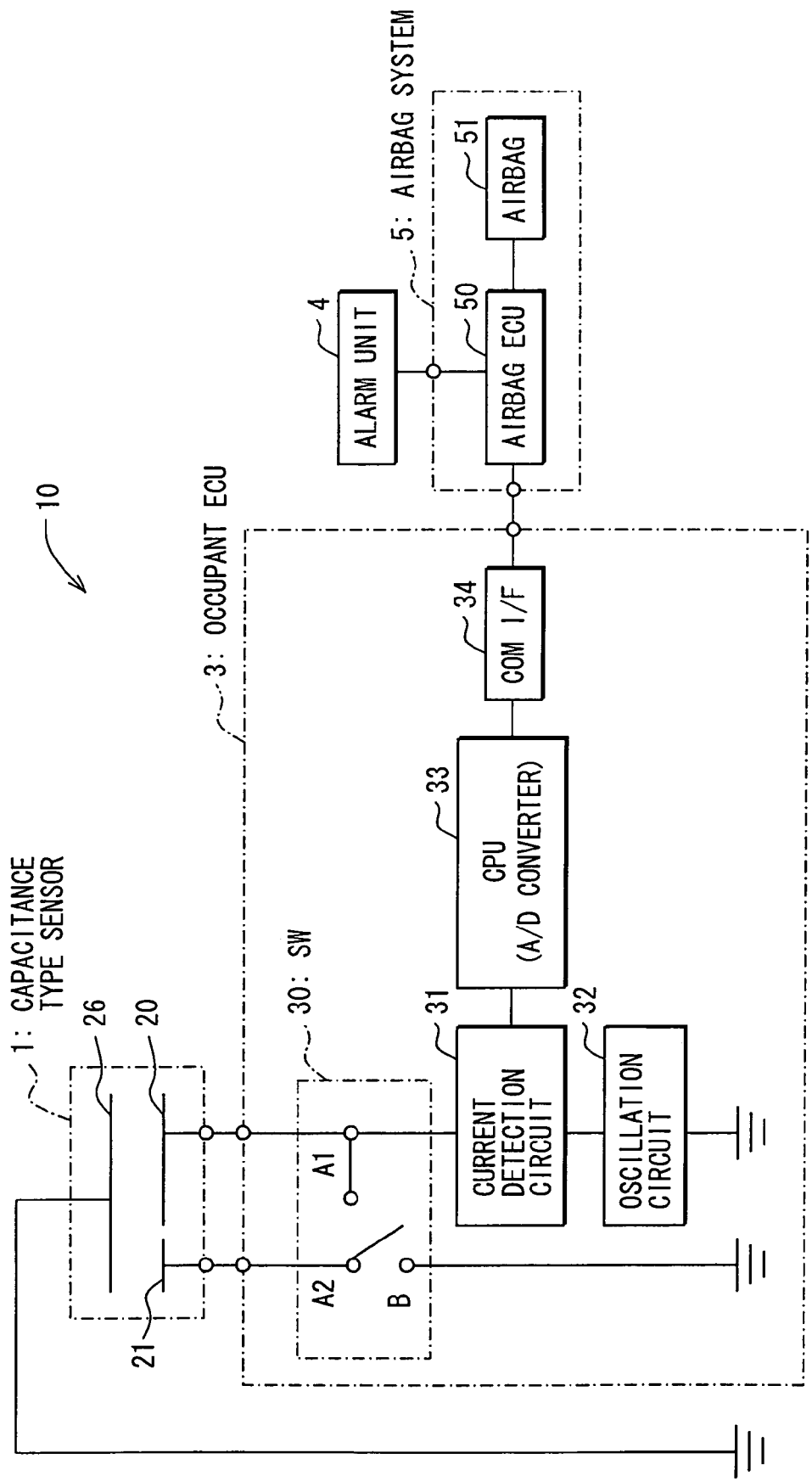
FIG. 5 is a block diagram of an occupant detection system according to the first embodiment.

Referring to FIG. 5, an occupant detection system 10 includes the capacitance type sensor 1, an occupant detection ECU 3, and an alarm unit 4. The occupant detection ECU 3 has a switch circuit 30, a current detection circuit 31, an oscillation circuit 32, a central processing unit (CPU) 33, a communication interface (COM I/F) 34. The switch circuit 30 has the first terminal A1, the second terminal A3, and the third terminal B. The first terminal A1 is connected with the first electrode 20, and the terminal A2 is connected with the second electrode 21. The third terminal B is grounded.

The current detection circuit 31 and the oscillation circuit 32 are connected with the first electrode 20. The oscillation circuit 32 generates high frequency low voltages. The current detection circuit 31 detects current flowing to the first electrode 20.

The CPU 33 is connected with the current detection circuit 31. The CPU 33 performs occupant determination and wetness determination based on current outputted from the current detection circuit 31. Results of the occupant determination and the wetness determination are converted from analog signals to digital signals by an analog-to-digital (A/D) converter of the CPU 33, and transmitted to an air bag ECU 50 of an air bag system 5 via the COM I/F 34. The air bag ECU 50 determines permission and prohibition of deployment of an air bag 51. The alarm unit 4 is arranged in a meter cluster (not shown) located in front of a driver's seat, and connected with the air bag ECU 50.

In an occupant determination mode, the first terminal A1 is connected with the second terminal A2, and a high frequency low voltage generated by the oscillation circuit 32 is applied to both first and second electrodes 20, 21.

Figure 6:
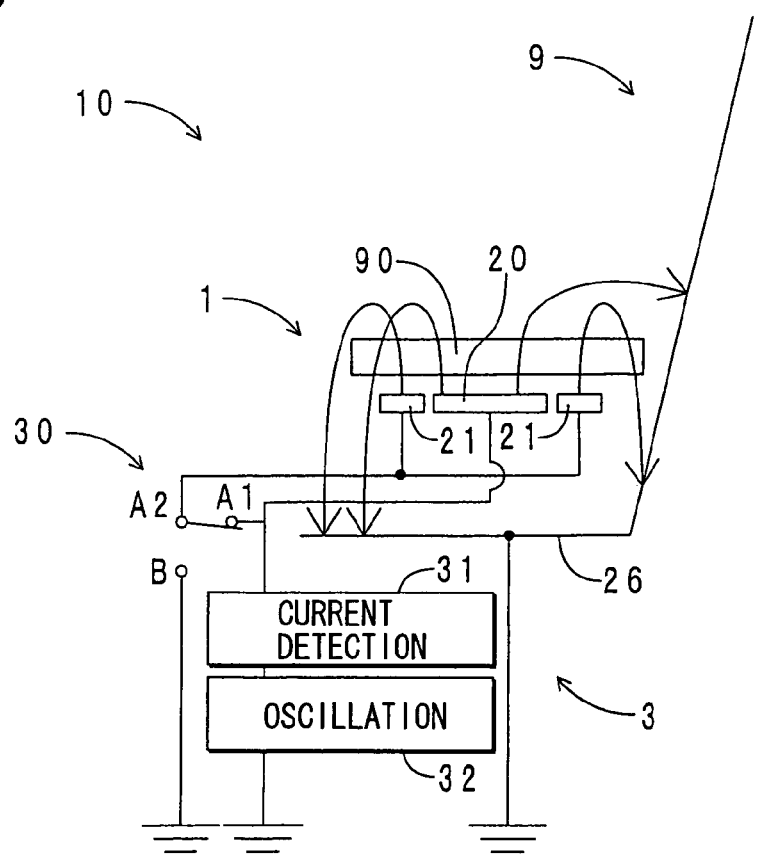
FIG. 6 is a frame format of the occupant detection system according to the first embodiment.

Referring to FIG. 6, an electric field is formed between the first and the second electrodes 20, 21 and the seat frame 26, as indicated with arrows, when the passenger seat is vacant. The first and the second electrodes 20, 21 are referred to as a high potential side and the seat frame 26 is referred to as a low potential side in the electric field. No object is present on the seat cover 90a when the seat is vacant. Thus, only air is present between the first and the second electrodes 20, 21 and the seat frame 26.

The current detection circuit 31 detects current flowing to the first and the second electrodes 20, 21. Current outputted from the current detection circuit 31 is compared with an occupant determination threshold stored for the occupant determination in the CPU 33. The current is smaller than the occupant determination threshold (current<threshold) when the seat is vacant. The result of the comparison is converted into a digital signal by the A/D converter. The digital signal is transmitted to the air bag ECU 50 via the COM I/F 34. The air bag ECU 50 determines prohibition of deployment of the air bag 51.

Figure 7:
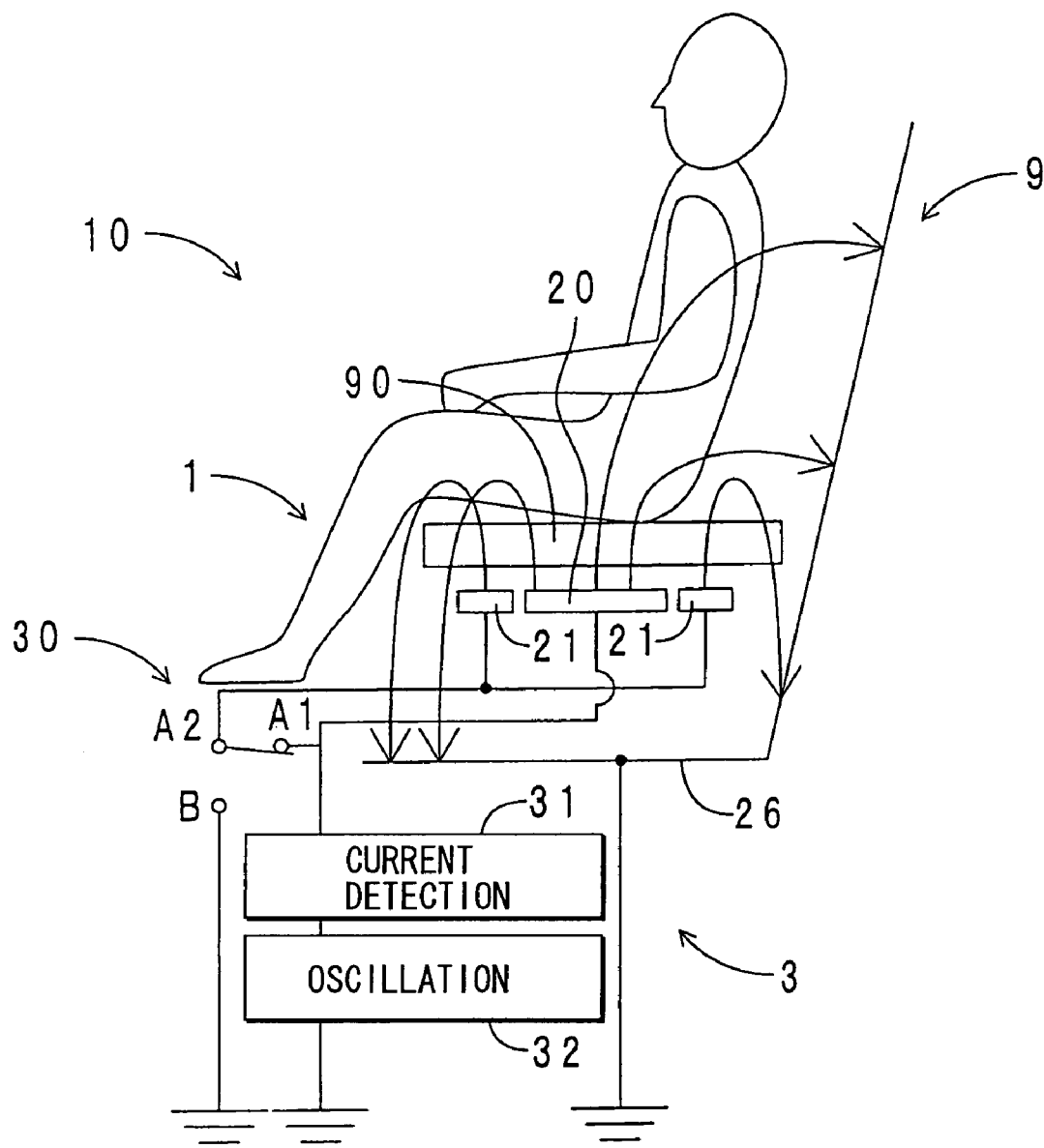
FIG. 7 is a frame format of the occupant detection system according to the first embodiment.

Referring to FIG. 7, a human body is present on the seat cover 90a. Namely, the human body is present between the first and the second electrodes 20, 21 when the seat is occupied by an adult. The current outputted from the current detection circuit 31 is larger in this case than the case that the seat 9 is vacant because the specific inductive capacity of the human body is larger than that of the air. The current is compared with the occupant determination threshold in the CPU 33. The current is equal to or larger than the occupant determination threshold (current≧threshold). The result of the comparison is transmitted to the air bag ECU 50 via the COM I/F 34. The air bag ECU 50 determines permission of deployment of the air bag 51.

The current is smaller than the occupant determination threshold (current<threshold) when the child seat is mounted to the seat 9 because the specific inductive capacity of the child seat is about 2-5. Thus, the air bag ECU 50 determines prohibition of deployment of the air bag 51 as in the case that the seat 9 is vacant.

The second terminal A2 is connected with the third terminal B in a wetness determination mode, namely, a high frequency low voltage generated by the oscillation circuit 32 is only applied to the first electrode 20 in the wetness determination mode. The occupant detection system 10 is placed into the wetness determination mode every time after placed into the occupant determination mode for several times.

Figure 8:
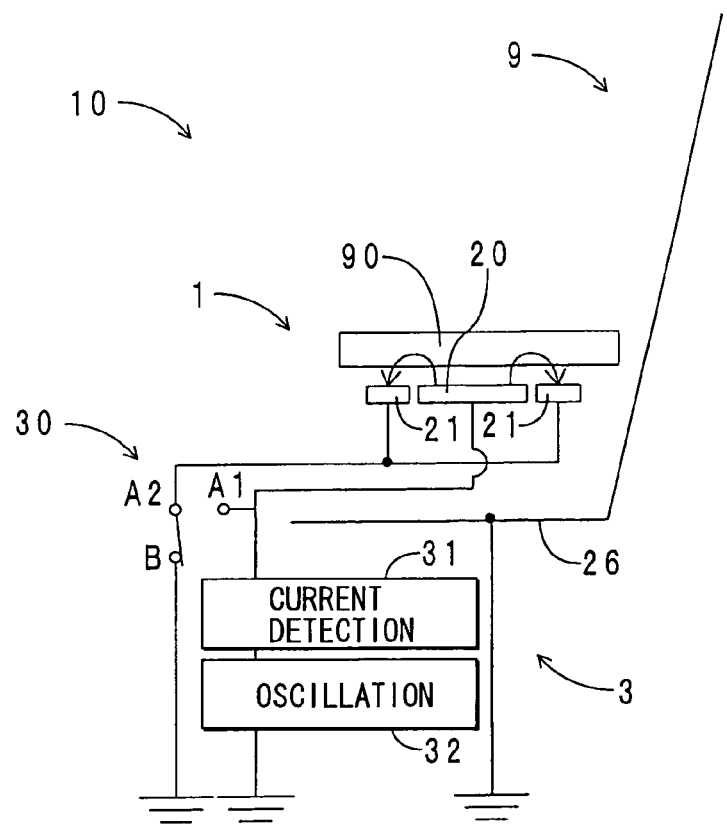
FIG. 8 is a frame format of the occupant detection system according to the first embodiment.

Referring to FIG. 8, an electric field is formed between the first electrode 20, which is a high potential side, and the second electrode 21, which is a low potential side, as indicated with arrows when the seat 9 is not wet. A water does not seep into the seat cover 90a when the seat 9 is not wet. Therefore, no water is present between the first electrode 20 and the second electrode 21. The current detection circuit 31 detects the current flowing to the first electrode 20. The current outputted from the current detection circuit 31 is compared with a wetness determination threshold stored for the wetness determination in the CPU 33. The current is smaller than the wetness determination threshold (current<threshold).

Figure 9:
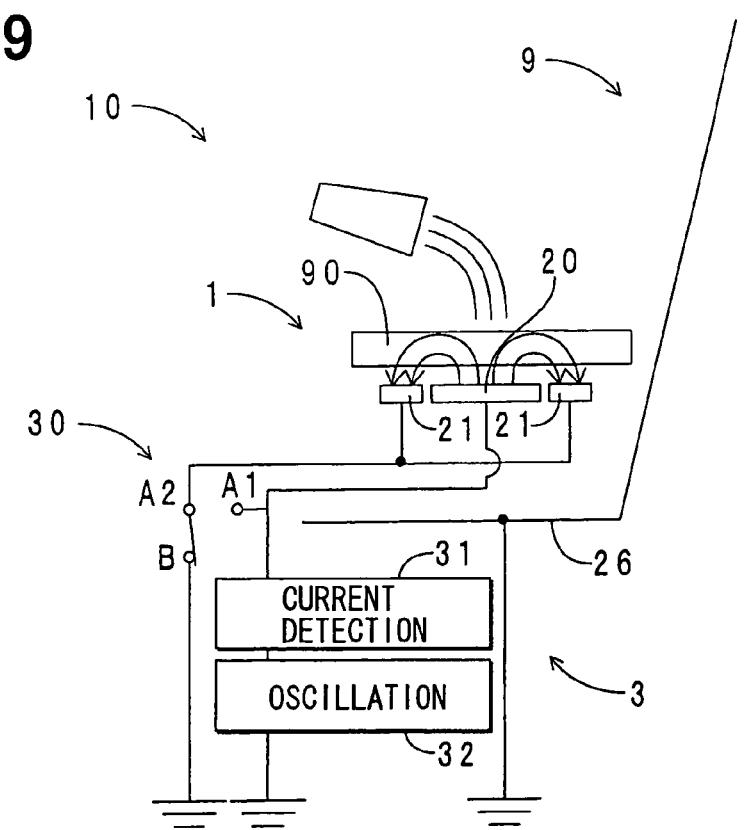
FIG. 9 is a frame format of the occupant detection system according to the first embodiment.

A water seeps into the seat cover 90a when the seat 9 is wet. As a result, the first electrode 20 and the second electrode 21 are electrically connected with each other via the water as shown in FIG. 9. The specific inductive capacity of water is 80, which is relatively large. Thus, the current outputted from the current detection circuit 31 is larger in the case that the seat 9 is wet than in the case that the seat 9 is not wet. The current is compared with the wetness determination threshold in the CPU 33. The current is equal to or larger than the wetness determination threshold (current≧threshold). The result of the comparison is transmitted to the air bag ECU 50 via the COM I/F 34. The air bag ECU 50 activates the alarm unit 4 in the meter cluster.

The first and the second electrodes 20, 21 are arranged inside the seat 9 rather than on a surface of the seat 9. Therefore, the human body is less likely to influence on the electric field between the first electrode 20 and the second electrode 21. Some kind of influence appears in the electric field only when a water seeps into the inside of the seat 9.

The occupant detection system 10 can determine whether the seat 9 is wet based on variations in the electric field appearing between the first electrode 20 and the second electrode 21. The occupant detection system 10 does not require an additional sensor, such as a weight sensor and a thickness sensor, for determining whether the seat 9 is wet. Therefore, the structure and the configuration of the occupant detection system 10 are simple. Furthermore, chronological variations in the outputs of the capacitance type sensor 1 are not required to be calculated. Thus, the circuit structure of the occupant detection ECU 3 is simple.

The second electrode 21 is arranged around the first electrode 20. A gap between the first and the second electrode 20, 21 is formed in a rectangular groove. Therefore, they can cover a relatively large area of the seat 9 for detecting the wetness. The first and the second electrodes 20, 21 are sealed and fixed with the film 22 in advance. Thus, the first and the second electrodes 20, 21 are easily mounted to the seat 9.

The seat frame 26 is used as a ground for the capacitance type sensor 1. This reduces the number of parts in comparison with a case that the third electrode is provided for the ground. The occupant determination mode and the wetness determination mode are flexibly switchable through the switch circuit 30. Thus, the wetness of the seat 9 can be periodically inspected. The alarm unit 4 provides a warning to a user when the accuracy of the occupant determination is decreased due to the wetness of the seat 9.

An experiment is performed to verify accuracy in the wetness determination of the occupant detection system 10 in the wetness determination mode. Namely, it is performed to verify whether the occupant detection system 10 properly differentiates between the case that the seat 9 is wet and occupied by and adult and the case that the seat 9 is wet but not occupied by an adult.

In the experiment, a frequency and a voltage of the oscillation circuit 32 is set to 100 kHz and 1V, respectively. A fabric and a layered urethane are used for the seat cover 90a with a thickness of 10 mm. The seating portion 90 is soaked with 200 ml of water. The first electrode 20 and the second electrode 21 are arranged with 200 mm of gaps between their opposed sides.

Figure 10:
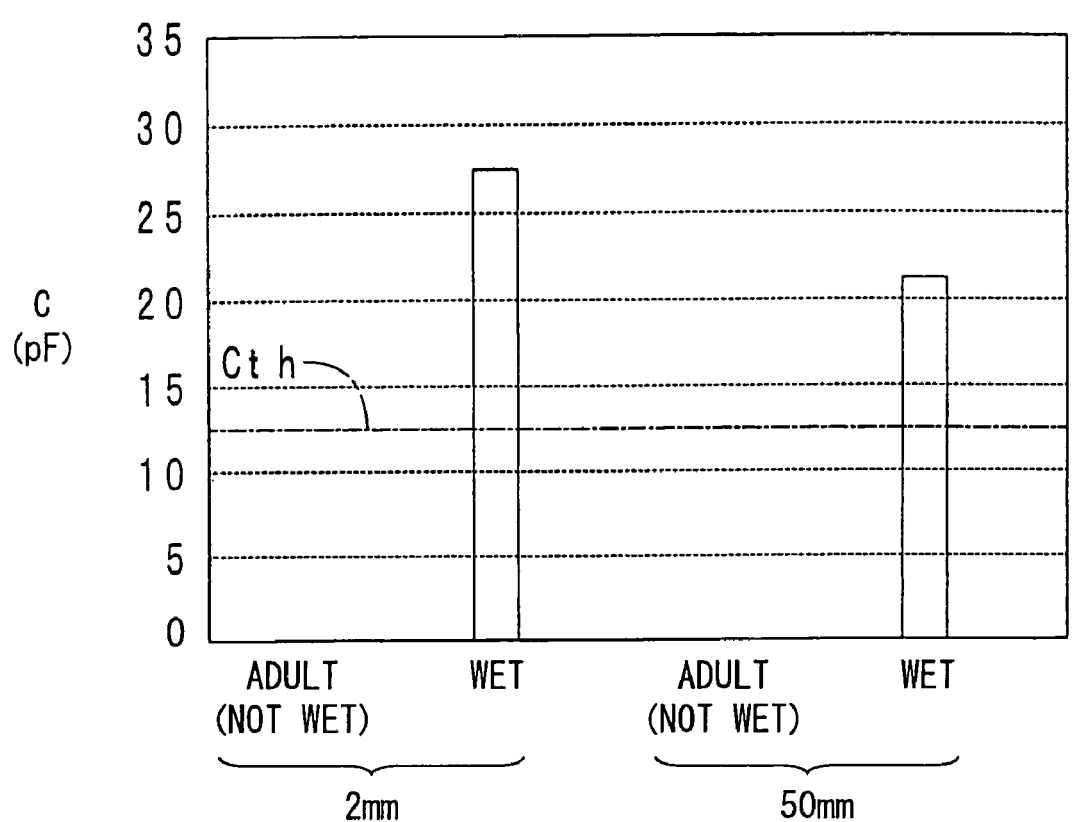
FIG. 10 is a graph showing results of experiments on the occupant detection system according to the first embodiment.

Capacitance C between the first electrode 20 and the second electrode 21 is measured in a condition that the seat 9 is occupied by an adult and not wet, and in a condition that the seat 9 is wet and not occupied by an adult. Results of the measurement is shown in FIG. 10. A left bar shows the capacitance C measured between the first and the second electrodes 20, 21 with a gap of 2 mm, and a right bar shows the capacitance C measured between the first and the second electrodes 20, 21 with a gap of 50 mm. The capacitance C is 0 when the seat 9 is vacant and not wet.

The capacitance C is 0 regardless of sizes of the gaps between the first and the second electrodes 20, 21 when the seat 9 is occupied by an adult. Namely, the capacitance C does not vary whether the seat 9 is occupied by an adult when the seat is not wet. The capacitance C exceeds a wetness determination threshold Cth regardless of the sizes of the gaps when the seat 9 is wet. It is verified that the wetness of the seat 9 can be determined based on a wetness determination threshold (current) that corresponds to the wetness determination threshold Cth (capacitance) if the wetness determination threshold (current) is prepared and stored in the CPU 33 in advance.

Furthermore, a difference between the condition that the seat 9 is occupied by an adult and not wet and the condition that the seat 9 is wet and not occupied by an adult is greater when the size of the gap is smaller. Namely, the wetness determination is more accurate when the size of the gap is smaller. However, the wetness can be determined even when the gap is 50 mm.

The gap between the first and the second electrodes 20, 21 are preferable to be in a range between 0.5 mm and 50 mm including 0.5 mm and 50 mm. If the gap is smaller than 0.5 mm, it is difficult to maintain the gap between the first and the second electrodes 20, 21. Thus, the gap is preferable to be equal to or larger than the 0.5 mm. If the gap is larger than 50 mm, the first and the second electrodes 20, 21 are less likely to be bridged by fluid, or water, seeping in the seat 9. Namely, the accuracy in the wetness determination decreases. Therefore, the gap is preferable to be equal to or smaller than 50 mm.

Second Embodiment

Figure 11:
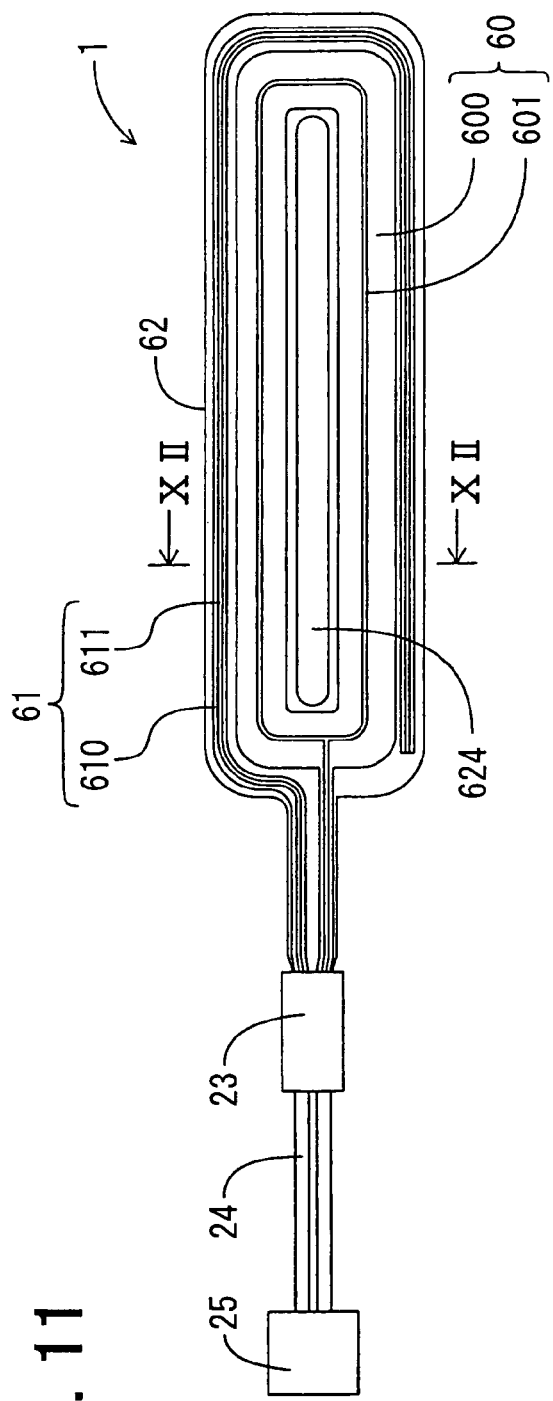
FIG. 11 is a top view of a capacitance type sensor according to the second embodiment of the present invention.
Figure 12:
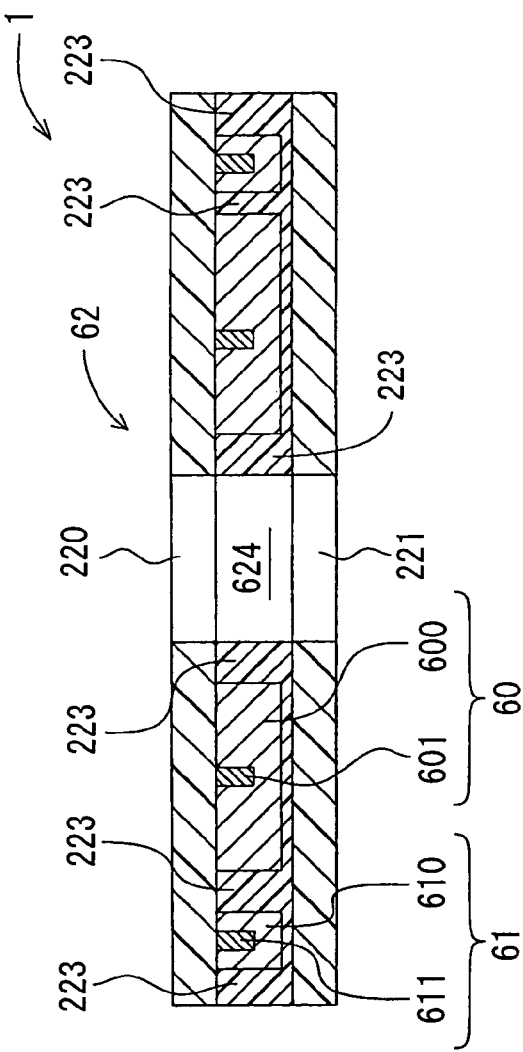
FIG. 12 is a cross-sectional view of the capacitance type sensor sectioned by the XII-XII line in FIG. 1 according to the second embodiment.

Referring to FIGS. 11 and 12, the capacitance type sensor 1 has the first electrode 60, the second electrode 61, and a film 62. The film 62 has a slit 624 formed substantially in rectangular in its center. The slit 624 has its longitudinal axis in the side-to-side direction of the vehicle. The first electrode 60, the second electrode 61, and the adhesive 223 do not lie in an area in which the slit 624 is located. Other configurations are the same as the first embodiment, and the same effects are produced. This configuration can improve the comfort of the occupant in the seat 9.

Third Embodiment

Figure 13:
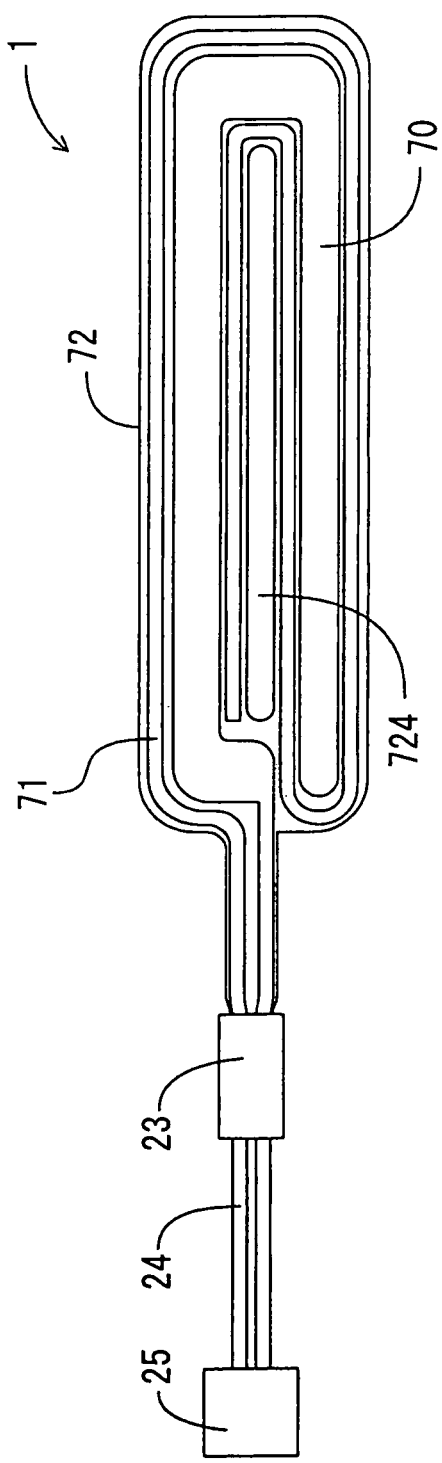
FIG. 13 is a top view of a capacitance type sensor according to the third embodiment of the present invention.

Referring to FIG. 13, the capacitive type sensor 1 has the first electrode 70, the second electrode 71, and a film 72. The first electrode 70 has a larger area than the second electrode 71. The second electrode 71 is arranged on an inner side and an outer side of the first electrode 70. More specifically, the second electrode 71 is arranged along inside and outside edges of the first electrode 70 as shown in FIG. 13. The silver portions of the first and the second electrodes 70, 71 are not shown in FIG. 13. Other configurations are the same as that of the second embodiment. The first electrode 70 is formed in a letter C-like shape. The second electrode 71 extends from the outside of the first electrode 70 to the inside via a separated part of the first electrode 70 such that it lies along the inside and the outside edges of the first electrode 70.

In addition to the effects produced by the second embodiment, this capacitive type sensor 1 can detects not only the wetness around the outer areas of the film 72 but also the wetness in a center area of the film 724 around the slit 724.

Fourth Embodiment

Figure 14:
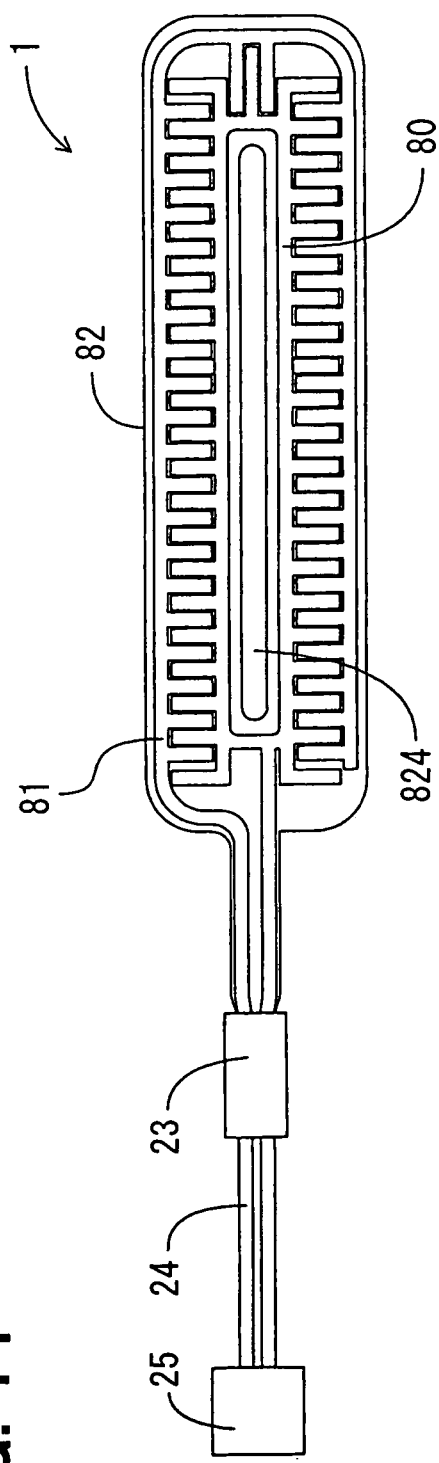
FIG. 14 is a top view of a capacitance type sensor according to the fourth embodiment of the present invention.

Referring to FIG. 14, the capacitive type sensor 1 has the first electrode 80, the second electrode 81, and a film 82. The first and the second electrode 80, 81 are formed in shapes of teeth of combs. The silver portions of the first and the second electrodes 80, 81 are not shown in FIG. 14. The first electrode 80 is formed in a rectangular frame with teeth that extend outwardly. The second electrode 81 is formed in a letter C with teeth that extend inwardly, and arranged along outer edges of the first electrode 80. The first and the second electrodes 80, 81 are arranged such that their teeth lie in alternate patterns. Gaps are formed in zigzag patterns between the teeth of the first and the second electrodes 80, 81.

The gaps are formed in a large area of the film 72. Therefore, this capacitive type sensor 1 can detects the wetness in almost entire area of the film 724 except for the area in which the slit 724 is formed. The same effects produced by the second embodiment are also produced by this capacitive type sensor 1.

Fifth Embodiment

Figure 15:
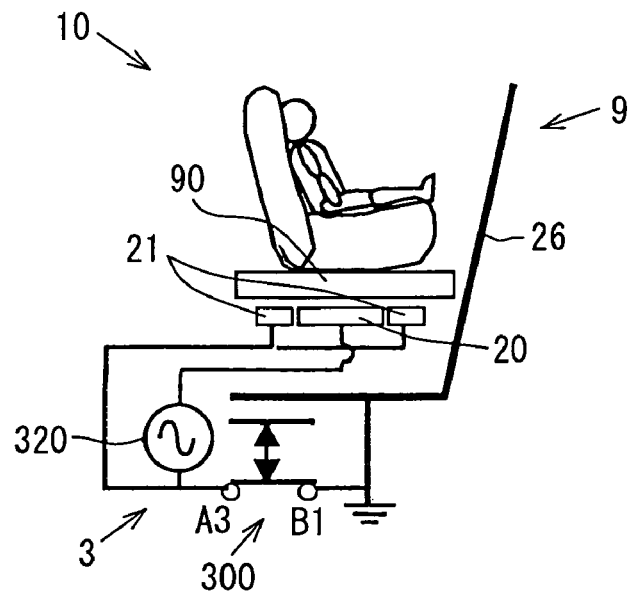
FIG. 15 is a frame format of an occupant detection system according to the fifth embodiment of the present invention.

Referring to FIG. 15, the occupant detection system 10 has a switch circuit 300. Other configurations are the same as the first embodiment. The switch circuit 300 has the first terminal A3 and the second terminal B1. The first and the second electrodes 20, 21 are connected with the first terminal A3 via the oscillation circuit 320. The seat frame 26 is connected with the second terminal B1. The current detection circuit 31 is connected with the first electrode 20 although it is not shown in FIG. 15.

Figure 16:
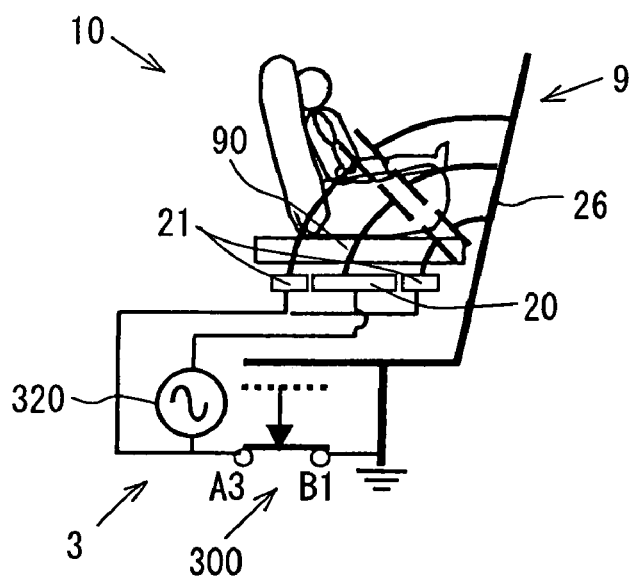
FIG. 16 is a frame format of the occupant detection system according to the fifth embodiment.

The first terminal A3 is connected with the second terminal B1 in the occupant detection mode, and a high frequency low voltage generated by the oscillation circuit 320 is applied to the first and the second electrodes 20, 21. As a result, an electric field is formed between the first and the second electrodes 20, 21, which are high potential sides, and the seat frame 26, which is a low potential side, as shown in FIG. 16. The current detection circuit 31 detects current flowing to the first electrode 20. Current outputted from the current detection circuit 31 is compared with the occupant detection threshold in the CPU 33. An occupant in the seat 9 is detected based on the comparison in the same manner as the first embodiment.

Figure 17:
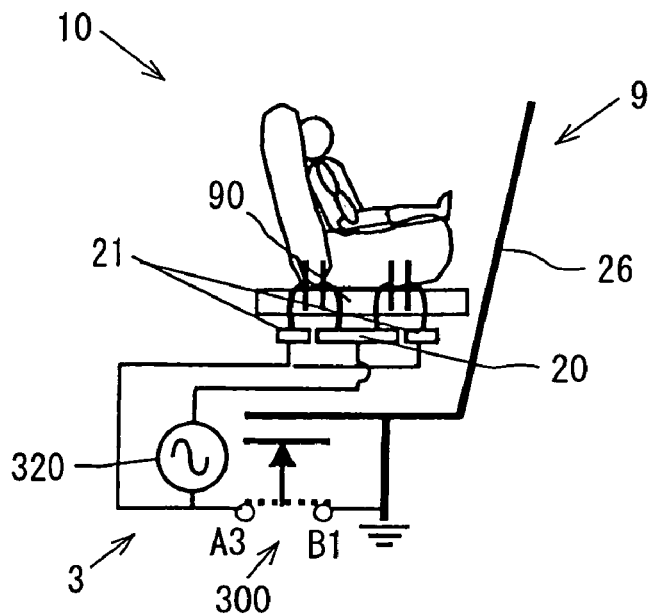
FIG. 17 is a frame format of the occupant detection system according to the fifth embodiment.

The first terminal A3 is isolated from the second terminal B1 in the wetness detection mode, and a high frequency low voltage generated by the oscillation circuit 32 is applied to the first and the second electrodes 20, 21. As a result, an electric field is formed between the first electrode 20, which is a high potential side, and the second electrode 21, which is a low potential side, as shown in FIG. 17. The current detection circuit 31 detects current flowing to the first electrode 20. Current outputted from the current detection circuit 31 is compared with the wetness threshold in the CPU 33. The wetness of the seat 9 is detected based on the comparison in the same manner as the first embodiment.

Sixth Embodiment

Figure 18:
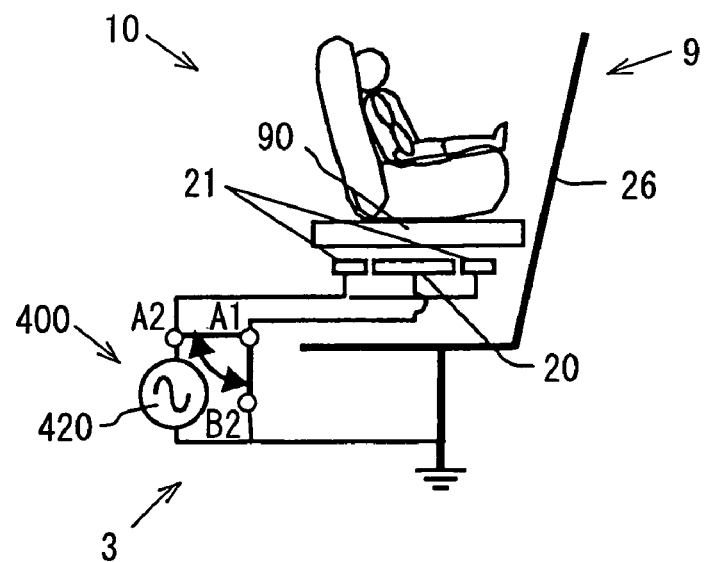
FIG. 18 is a frame format of an occupant detection system according to the sixth embodiment of the present invention.

Referring to FIG. 18, the occupant detection system 10 has a switch circuit 400. Other configurations are the same as the fifth embodiment. The switch circuit 400 has the first terminal A1, the second terminal A2, and the third terminal B2. The first terminal A1, the second terminal A2, and the third terminal B2 are connected with the first electrode 20, the second electrode 21, and the seat frame 26, respectively. The current detection circuit 31 and the oscillation circuit 32 are connected with the second electrode 21.

Figure 19:
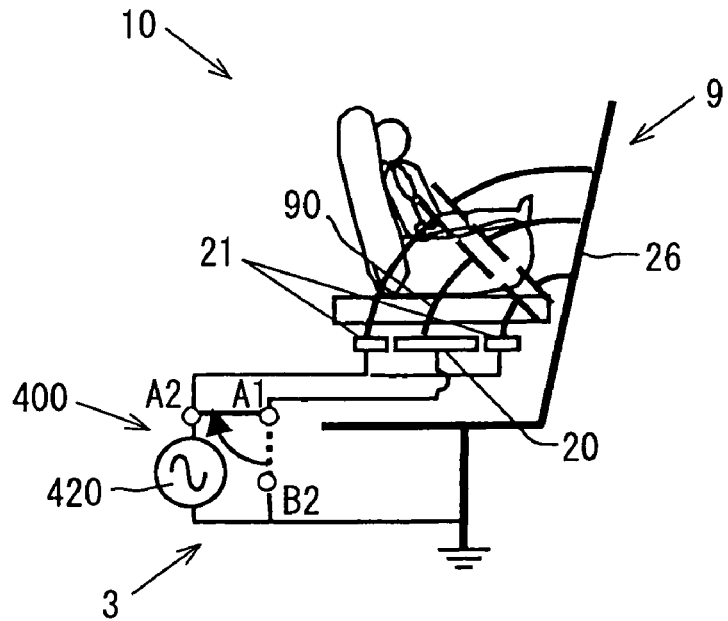
FIG. 19 a frame format of the occupant detection system according to the sixth embodiment.

The first terminal A1 is connected with the second terminal A2 in the occupant detection mode, namely, the first and the second electrodes 20, 21 are set to the same potential. A high frequency low voltage generated by the oscillation circuit 32 is applied to the first and the second electrodes 20, 21. As a result, an electric field is formed between the first and the second electrodes 20, 21, which are high potential sides, and the seat frame 26, which is a low potential side, as shown in FIG. 19. The current detection circuit 31 detects current flowing to the first electrode 20. Current outputted from the current detection circuit 31 is compared with the occupant detection threshold in the CPU 33. An occupant in the seat 9 is detected in the same manner as the first embodiment.

Figure 20:
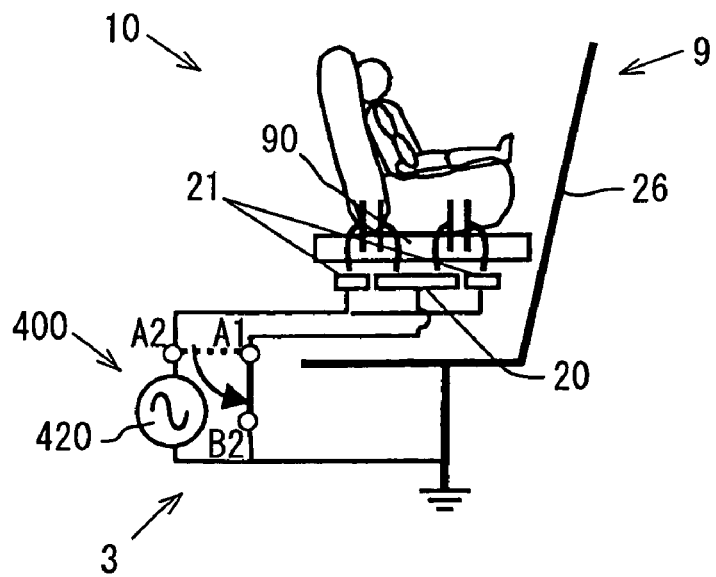
FIG. 20 is a frame format of the occupant detection system according to the sixth embodiment.

The first terminal A1 is connected with the third terminal B2 in the wetness detection mode, namely, the first electrode 20 and the seat frame 26 are set to the same potential. A high frequency low voltage generated by the oscillation circuit 32 is applied to the first and the second electrodes 20, 21. As a result, an electric field is formed between the second electrode 21, which is a high potential side, and the first electrode 20, which is a low potential side, as shown in FIG. 20. The current detection circuit 31 detects current flowing to the second electrode 21. Current outputted from the current detection circuit 31 is compared with the wetness determination threshold in the CPU 33. The wetness of the seat 9 is detected in the same manner as the first embodiment.

Seventh Embodiment

The occupant detection system 10 is programmed to determine that the seat 9 is wet when an output of the capacitance type sensor 1 is equal to or larger than the occupant determination threshold in the occupant detection mode and it is equal to or larger than the wetness determination threshold in the wetness determination mode. The output of the capacitance type sensor 1 in the occupant determination mode is referred to as a human body detection capacity Ch and that in the wetness determination mode is referred to as a wetness detection capacity Cw.

Figure 21:
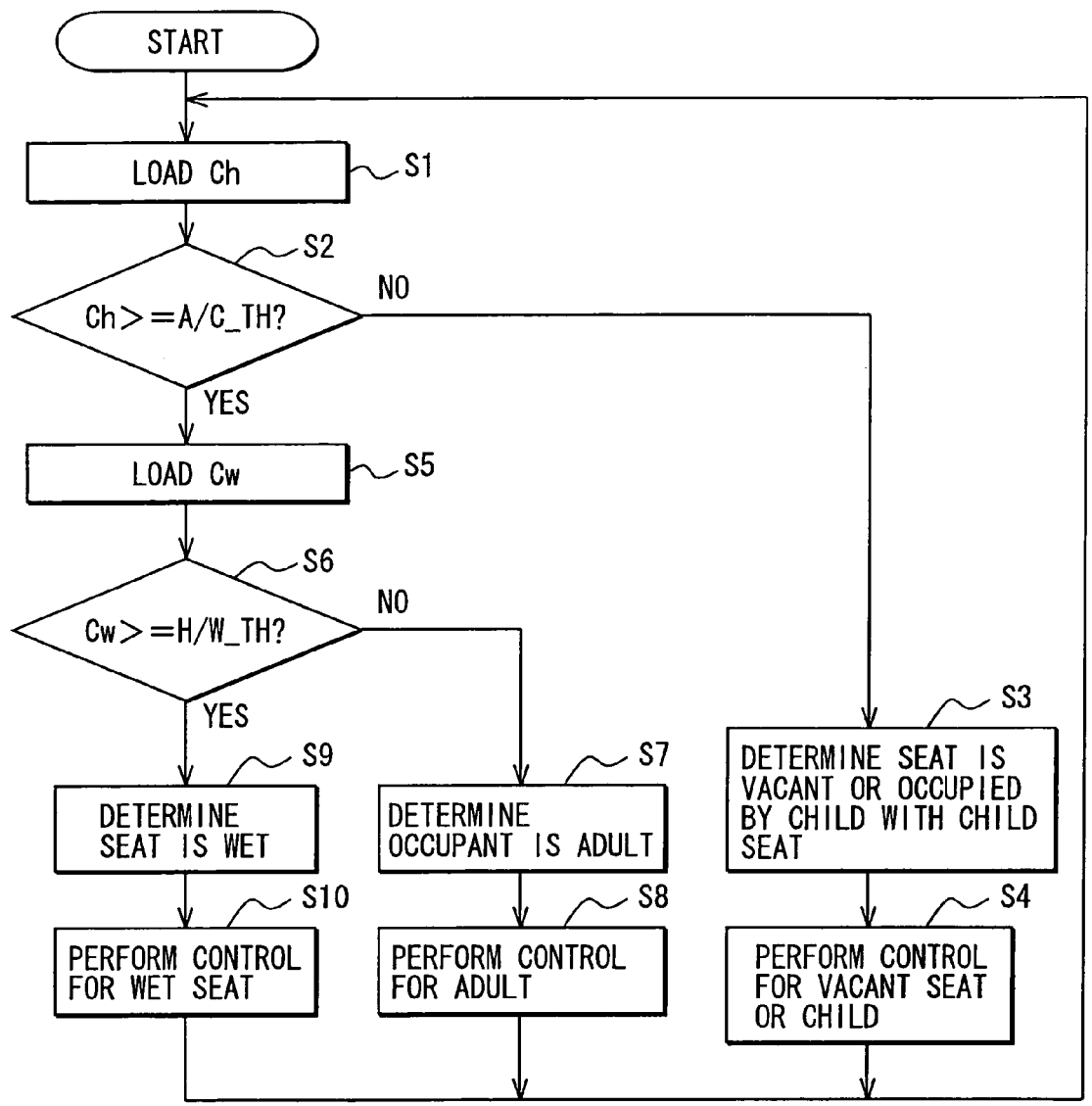
FIG. 21 is a flowchart of an occupant and wetness determination process according to the seventh embodiment of the present invention.

A flowchart of an occupant and wetness determination process is shown in FIG. 21. The human body detection capacity Ch is loaded in the occupant determination mode (S1), and it is compared with an occupant determination threshold A/C_TH (S2). If the human body detection capacity Ch is smaller than the occupant determination threshold A/C_TH (No at step S2), the occupant detection system 10 determines that the seat 9 is vacant or occupied by a child with a child seat (S3). It performs control appropriate for the vacant seat 9 or the child in the child seat (S4). For example, it determines a prohibition of activation of the air bag system 5, and performs appropriate control for disabling the deployment of the air bag 51.

If the human body detection capacity Ch is equal to or larger than the occupant determination threshold A/C_TH (Yes at step S2), the wetness detection capacity Cw is loaded in the wetness determination mode (S5), and compared with the wetness determination threshold H/W_TH (S6). If the wetness detection capacity Cw is smaller than the wetness determination threshold H/W_TH (No at step S6), the occupant detection system 10 determines that the occupant is an adult (S7), and performs control appropriate for the adult (S8). For example, it determines a permission of activation of the air bag system 5, and performs appropriate control for enabling the deployment of the air bag 51.

If the wetness detection capacity Cw is equal to or larger than the wetness determination threshold H/W_TH (Yes at step S6), the occupant detection system 10 determines that the seat 9 is wet (S9), and performs control appropriate for the wet condition of the seat 9 (S10). For example, it determines a permission of activation of the air bag system 5, and performs appropriate control for enabling the deployment of the air bag 51 and for activating the alarm unit 4.

The wet condition of the seat 9 changed in a reversible fashion, namely, the moisture in the seat 9 evaporates over time. A wet condition of the seat 9 should not be detected more than necessary. With the above-described configuration, the wet condition is not detected when the wet condition does not affect the control of the air bag system 5, or other passive safety systems. For example, the wet condition is not detected when the seat 9 is vacant or occupied by a child with a child seat under a condition that the wet condition of the seat 9 is determined.

Eighth Embodiment

The occupant detection system 10 stores an adult/wetness determination threshold for determining whether the seat 9 is occupied by an adult and whether the seat 9 is wet. The occupant detection system 10 is programmed to determine such conditions based on the occupant determination threshold, the wetness determination threshold, and an output of the capacitance type sensor 1 in the occupant determination mode. The output of the capacitance type sensor 1 in the occupant determination mode is the human body detection capacity Ch. More specifically, the occupant detection system 10 determines that the occupant is an adult regardless of the wetness detection capacity if the human body detection capacity is equal to or larger than the adult/wetness determination threshold.

Figure 22:
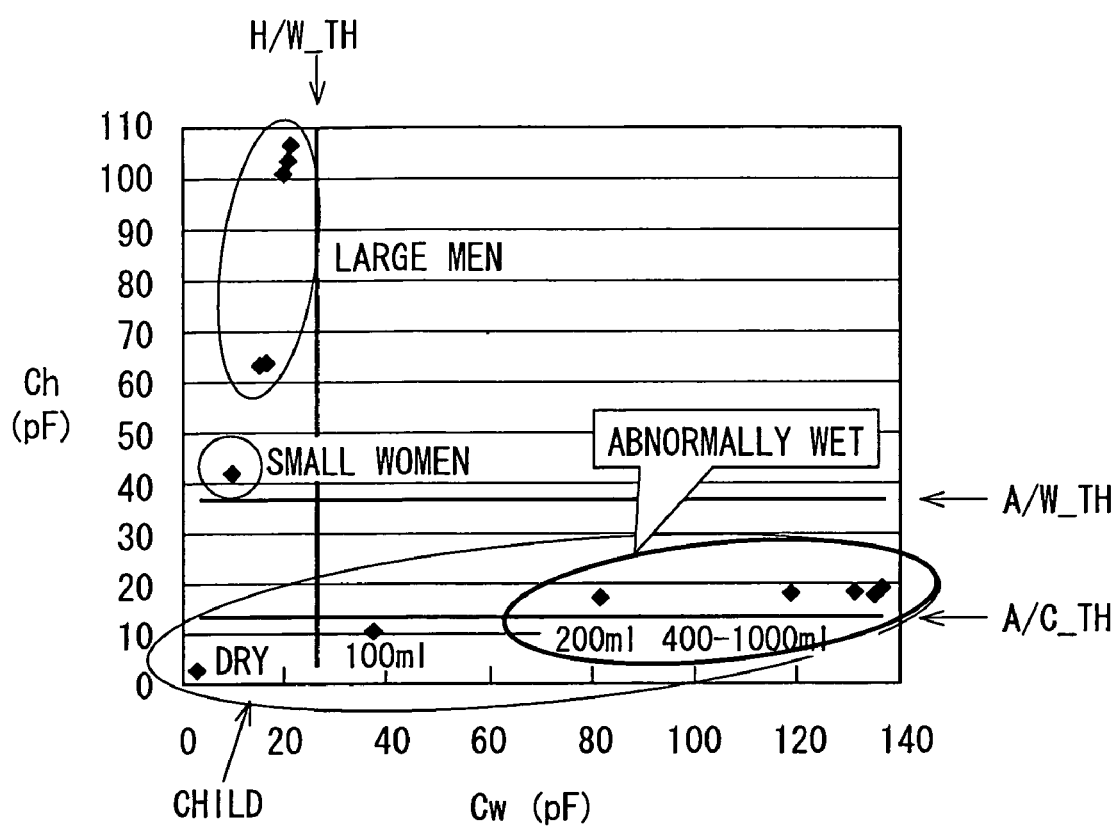
FIG. 22 is a graph showing distributions of a human body detection capacity Ch and a wetness detection capacity Cw, and relationships between them and each threshold according to the eighth embodiment of the present invention.

Distributions of the human body detection capacity Ch and the wetness detection capacity Cw, and relationships between them and each threshold are shown in FIG. 22. The human body detection capacity Ch has a distribution range of 55 to 110 pF for large men and that of 35 to 50 pF for small women. The wetness detection capacity Cw is about 0 pF in a dry condition. It has a distribution range about 40 pF to 140 pF in which it gradually increases as the amount of moisture in the seat 9 increases from 100 ml to 1000 ml.

The occupant determination threshold A/H_TH is set to 14 pF of the human body detection capacity Ch (Y-axis of the Cw-Ch graph shown in FIG. 22). The wetness determination threshold H/W_TH is set to 28 pF of the wetness detection capacity Cw (X-axis of the Cw-Ch graph). The human body detection capacity Ch is larger than the occupant determination threshold A/C_TH when the amount of moisture is equal to or larger than 200 ml. This indicates that the human body detection capacity Ch becomes abnormally large due to the wetness of the seat 9. The adult/wetness determination threshold A/W_TH is set to a value larger than the occupant determination threshold A/C_TH and smaller than the occupant detection capacity Ch for small women, for instance, 34 pF.

Figure 23:
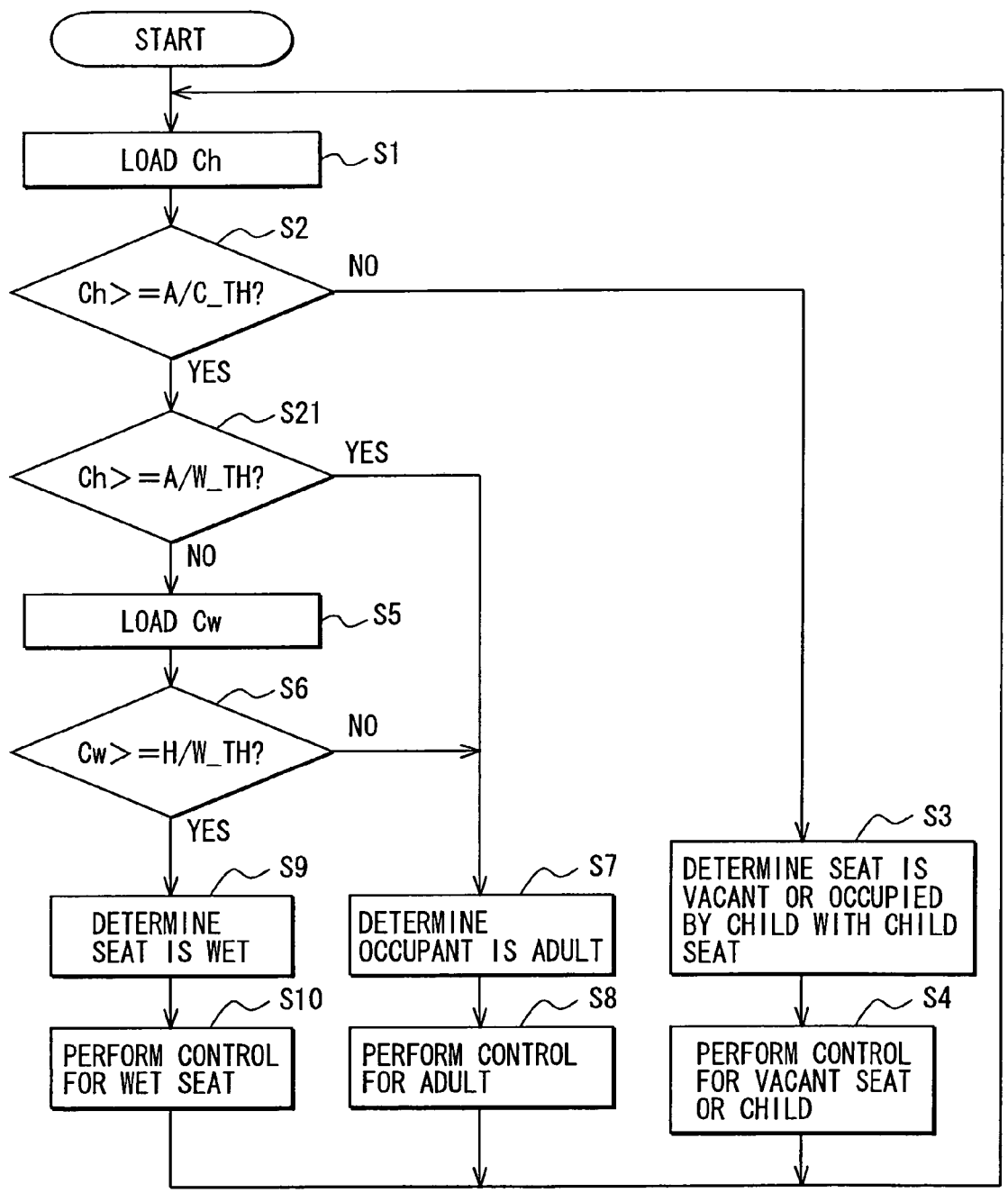
FIG. 23 is a flowchart of an occupant and wetness determination process according to the eighth embodiment.

A flowchart of the occupant and wetness determination process is shown in FIG. 23. Steps indicated with the same numerals as the steps in the flowchart shown in FIG. 21 are performed in the same manner as those steps. Therefore, they will not be discussed here.

If the human body detection capacity Ch is equal to or larger than the occupant determination threshold A/C_TH (Yes at step S2), the occupant detection system 10 determines whether the human body detection capacity Ch is equal to or larger than the adult/wetness determination threshold A/W_TH (S21). If the human body detection capacity Ch is equal to or larger than the adult/wetness determination threshold A/W_TH (Yes at step S21), it determines that the occupant is an adult (S7), and performs and performs control appropriate for the adult (S8). For example, it determines a permission of activation of the air bag system 5, and performs appropriate control for enabling the deployment of the air bag 51.

If human body detection capacity Ch is smaller than the adult/wetness determination threshold A/W_TH (Yes at step S21), it determines that the seat 9 is wet (S9), and performs control appropriate for the wet condition of the seat 9 (S10). For example, it determines a permission of activation of the air bag system 5, and performs appropriate control for enabling the deployment of the air bag 51 and for activating the alarm unit 4.

When the seat cover 90*a* and the seat cushion 90*b* are made of resin form, an wet area of the seat 9 increases only up to a certain extent even when the amount of water seeped into the seat 9 increases, such as in a case that the seat 9 is exposed to the rain. Therefore, the human body detection capacity increases only up to a certain extent. With the above-described condition, the occupant detection system 10 determines that the occupant in the seat 9 is an adult regardless of the amount of water when the occupant detection capacity is equal to or larger than the adult/wetness determination threshold A/W_TH. Thus, a wet condition is further less likely to be detected when it is necessary to be detected.

Ninth Embodiment

The occupant detection system 10 performs the occupant determination and the passive safety system control based on the human body detection capacity Ch and the occupant determination threshold (A/C_TH) when the wetness detection capacity Cw is smaller than the adult/wetness determination threshold A/W. It performs a process for activating a warning system when the wetness detection capacity is equal to or larger than the adult/wetness determination threshold A/W_TH. It determines that the seat 9 is abnormally wet and the occupant is an adult when the human body detection capacity Ch is equal to or larger than the adult/wetness determination threshold A/W_TH. Then, it performs a part of passive safety system control and the warning system activation process.

Figure 24:
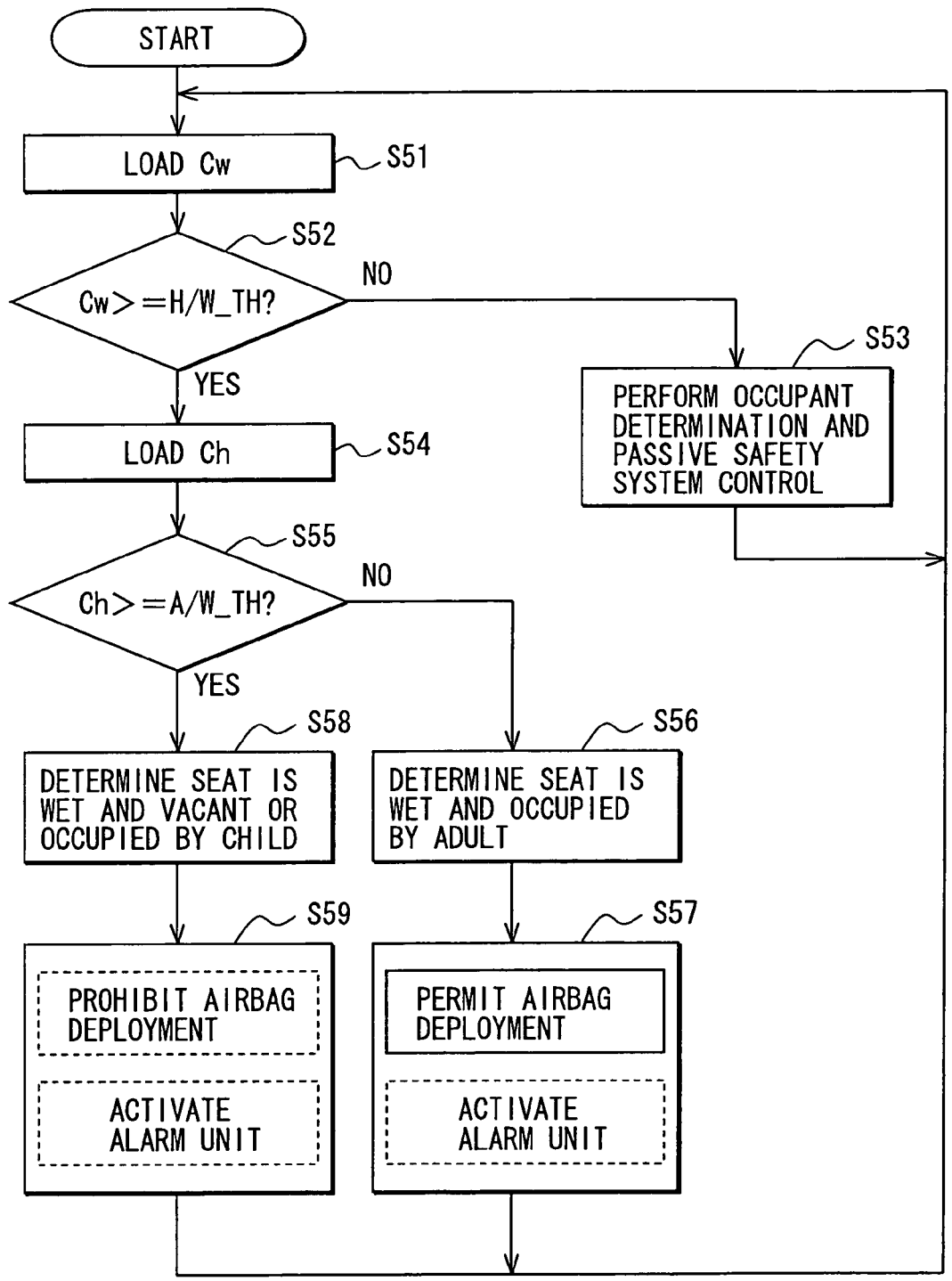
FIG. 24 is a flowchart of an occupant and wetness determination process according to the ninth embodiment.

A flowchart of a occupant and wetness determination process is shown in FIG. 24. The occupant detection system 10 performs loads the wetness detection capacity Cw in the wetness determination mode (S51). It determines whether the wetness detection capacity Cw is smaller than the wetness determination threshold H/W_TH (S52). If the wetness detection capacity Cw is smaller than the wetness determination threshold H/W_TH (No at step S52), the occupant detection system 10 performs the occupant determination and passive safety system control (S53). More specifically, it loads the human body detection capacity Ch in the occupant determination mode. It determines that the seat 9 is vacant, occupied by an adult, or occupied by a child with a child seat based on a comparison between the human body detection capacity Ch and the occupant determination threshold A/C_TH. It performs passive safety system control appropriate for the determination result.

If the wetness detection capacity Cw is equal to or larger than the wetness determination threshold H/W_TH (Yes at step S52), the occupant detection system 10 loads the human body detection capacity Ch (S54). It determines whether the human body detection capacity Ch is equal to or larger than the adult/wetness determination threshold A/W_TH (S55). If the human body detection capacity Ch is equal to or larger than the adult/wetness determination threshold A/W_TH (Yes at step S55), it determines that the seat 9 is wet and the occupant is an adult (S56). It performs passive safety system control appropriate for an adult and a part of a warning system activation process (S57). For example, it determines a permission of activation of the air bag system 5, performs appropriate control for enabling the deployment of the air bag 51, and activates the alarm unit 4.

If the human body detection capacity Ch is smaller than the adult/wetness threshold A/W_TH (No at step S55), it determines that the seat 9 is wet and vacant or occupied by a child with a child seat (S58). It performs passive safety system control appropriated for the vacant seat or a child in a child seat and activates the alarm unit 4 (S59). For example, it determines a prohibition of activation of the air bag system 5, performs appropriate control for disabling the deployment of the air bag 51, and activates the alarm unit 4.

The occupant detection system 10 performs the occupant determination and the passive safety system control based on the human body detection capacity Ch and the occupant determination threshold A/C_TH when the seat 9 is not wet. It performs the warning system activation process for notifying the occupant of the abnormally wet condition of the seat 9 when the wetness detection capacity Cw is equal to or larger than the adult/wetness determination threshold A/W_TH. It performs the warning system activation process in that condition even when the wetness of the seat 9 does not affect the passive safety system control.

If it determines that the occupant is an adult, it performs the passive safety system control in the same manner as the case that the seat 9 is not wet, or in a normal condition, even when the seat 9 is wet, and performs a part of the warning system activation process.

The present invention should not be limited to the embodiment previously discussed and shown in the figures, but may be implemented in various ways without departing from the spirit of the invention. For example, the first and the second electrodes 20, 21 may be made of conductive cloth, metal in a string-like shape, conductive paint, or other conductive materials. A body of the vehicle can be the third electrode, or the third electrode can be provided separately from the seat frame 26. A constant voltage electrode may be configured for the third electrode by using a 5V-power supply (not shown) of the occupant detection ECU 3.

The first and the second electrodes 20, 21 may be arranged in a rear seat, a backrest portion of the seat 9, or a backrest portion of the rear seat. The upper and the lower films 220, 221 may be made of polyethylene naphthalate. The alarm unit 4 can be arranged in a display of a navigation system. A warning can be produced by tuning or flushing of a lamp, generating a voice, or altering tension of a seatbelt. The switch circuit 30 may be configured with other devices including multiplexer ICs, transistors, and relays.

In the occupant determination process, each comparison step may be performed based on values detected at least at two points. In this case, erroneous wet condition determination due to noises is less likely to occur. More specifically, an averaging procedure can be applied by using a filter, or the abnormally wet condition may be determined when the values consecutively detected in a certain period. A result of the determination may be accepted when the same results are obtained from repeatedly performed comparison between the detected value and a threshold.

The warning system activation process may be terminated when the seat 9 is almost dry and the human body capacity can be determined in a regular manner. With this configuration, the warning system activation process is less likely to continue when it is not necessary. It may be terminated when the abnormally wet condition is not detected for a certain period after the wet condition is detected last time. It may be terminated while an ignition switch is being turned on, or while the ignition switch is turned on next time.

What is claimed is:

1. A capacitance type sensor comprising:
a first electrode arranged inside any one of a seating portion and a backrest portion of a seat in a vehicle;
a second electrode arranged adjacent to the first electrode inside any one of the seating portion and the backrest portion of the seat, whichever the first electrode is arranged, and forming an electric field together with the first electrode therebetween in a wetness determination mode in which a wet condition of the seat is determined; and
a third electrode that forms an electric field together with the first and the second electrodes therebetween in an occupant determination mode in which an occupant in the seat is determined,
wherein the second electrode is substantially co-planar with the first electrode and is arranged immediately around the first electrode on at least one of an inner side and an outer side thereof, the first electrode and the second electrode separated only by an air gap.

2. The capacitance type sensor according to claim 1, wherein the first and the second electrodes are arranged with a gap in a range between 0.5 mm and 50 mm including 0.5 mm and 50 mm.

3. The capacitance type sensor according to claim 1, wherein the first and the second electrode are formed in shapes of teeth of combs, and arranged such that teeth thereof lie in alternate patterns.

4. The capacitance type sensor according to claim 1, further comprising a film that seals the first and the second electrodes therein, wherein the film has a slit in an area in which the first and the second electrodes do not lie.

5. The capacitance type sensor according to claim 1, wherein the third electrode is a ground electrode that is electrically connected with a body of the vehicle.

6. An occupant detection system comprising:
a first electrode arranged inside any one of a seating portion and a backrest portion of a seat in a vehicle, a second electrode arranged adjacent to the first electrode inside any one of the seating portion and the backrest portion of the seat, whichever the first electrode is arranged, and forming an electric field together with the first electrode therebetween in a wetness determination mode in which a wet condition of the seat is determined, and a third electrode that forms an electric field together with the first and the second electrodes therebetween in an occupant determination mode in which an occupant in the seat is determined; and
an occupant detection electronic control unit that determines whether the seat is wet based on an output of the capacitance type sensor in the wetness determination mode, and determines an occupant in the seat based on an output of the capacitance type sensor in the occupant determination mode,
wherein the second electrode is substantially co-planar with the first electrode and is arranged immediately around the first electrode on at least one of an inner side and an outer side thereof, the first electrode and the second electrode separated only by an air gap.

7. The occupant detection system according to claim 6, further comprising a warning system that produces a warning when the wet condition of the seat is determined in the wetness determination mode.

8. The occupant detection system according to claim 6, further comprising a switch circuit that switches between the wetness determination mode and the occupant determination mode.

9. The occupant detection system according to claim 6, wherein:
the occupant detection electronic control unit stores an occupant determination threshold for determining one of conditions that the seat is vacant, the seat is occupied by an adult. and the seat is occupied by a child with a child seat based on an output of the capacitance type sensor, which is a human body detection capacitance, in the occupant determination mode, and a wetness determination threshold for determining whether the seat is wet based on an output of the capacitance type sensor, which is a wetness detection capacity, in the wetness determination mode; and
the occupant detection electronic control unit is programmed to determine that the seat is wet when the human body detection capacity is equal to or larger than the occupant determination threshold and the wetness detection capacity is equal to or larger than the wetness determination threshold.

10. The occupant detection system according to claim 9, wherein:
the occupant detection electronic control unit further stores an adult and wetness determination threshold for determining a condition that the seat is occupied by an adult and a condition that the seat is wet; and
the occupant detection electronic control unit is programmed to determine that the seat is occupied by an adult regardless of the wetness detection capacity when the human body detection capacity is equal to or larger than the adult and wetness determination threshold.

11. The occupant detection system according to claim 9, wherein:
the occupant detection electronic control unit is programmed to perform comparison steps in which the human body detection capacity is compared with the occupant determination threshold and the wetness detection capacity is compared with the wetness determination threshold; and
each comparison step is performed based on values detected at least at two points.

12. The occupant detection system according to claim 9, wherein:
the occupant detection electronic control unit is programmed to perform the warning system activation process appropriated for the determined condition when the seat is determined as abnormally wet based on the wetness detection capacity; and
the occupant detection electronic control unit is programmed to terminate the warning system activation process when the seat is almost dry and the human body capacity is determined in a regular manner.

13. The occupant detection system according to claim 9, wherein:
the occupant detection electronic control unit is programmed to store a condition that the seat is abnormally wet in a nonvolatile memory included therein as current data when the seat is determined as abnormally wet based on the wetness detection capacity; and
the occupant detection electronic control unit is programmed to store the condition in the nonvolatile memory as history data when the seat is almost dry and the human body capacity is determined in a regular manner.

14. The occupant detection system according to claim 6, wherein:
the occupant detection electronic control unit stores an occupant determination threshold for determining one of conditions that the seat is vacant, the seat is occupied by an adult, and the seat is occupied by a child with a child seat based on an output of the capacitance type sensor, which is a human body detection capacitance, in the occupant determination mode, and a wetness determination threshold for determining whether the seat is wet based on an output of the capacitance type sensor, which is a wetness detection capacity, in the wetness determination mode;

the occupant detection electronic control unit is programmed to perform the occupant determination based on the human body detection capacity and control of a passive safety system when the wetness detection capacity is smaller than the wetness determination threshold; and the occupant detection electronic control unit is programmed to perform a warning system activation process when the wetness detection capacity is equal to or larger than the wetness determination threshold.

15. The occupant detection system according to claim 14, wherein:

the occupant detection electronic control unit stores an adult and wetness determination threshold for determining a condition that the seat is occupied by an adult and a condition that the seat is wet based on the human body detection capacity;

the occupant detection electronic control unit is programmed to determine that the seat is abnormally wet and occupied by an adult when the human body detection capacity is equal to or larger than the adult and wetness determination threshold; and the occupant detection electronic control unit is programmed to perform control of the passive safety system and a part of a warning system activation process.

16. An occupant detection system comprising:

a first electrode arranged inside any one of a seating portion and a backrest portion of a seat in a vehicle, a second electrode arranged adjacent to the first electrode inside any one of the seating portion and the backrest portion of the seat, whichever the first electrode is arranged, and forming an electric field together with the first electrode therebetween in a wetness determination mode in which a wet condition of the seat is determined, and a third electrode that forms an electric field together with the first and the second electrodes therebetween in an occupant determination mode in which an occupant in the seat is determined;

an occupant detection electronic control unit that determines whether the seat is wet based on an output of the capacitance type sensor in the wetness determination mode, and determines an occupant in the seat based on an output of the capacitance type sensor in the occupant determination mode; and a switch circuit that switches between the wetness determination made and the occupant determination mode, wherein the switch circuit electrically connects the first, the second, and the third electrodes with each other in the occupant determination mode, and electrically isolates the first, the second, and the third electrodes in the wetness determination mode.

17. An occupant detection system comprising:

a first electrode arranged inside any one of a seating portion and a backrest portion of a seat in a vehicle, a second electrode arranged adjacent to the first electrode inside any one of the seating portion and the backrest portion of the seat, whichever the first electrode is arranged, and forming an electric field together with the first electrode therebetween in a wetness determination mode in which a wet condition of the seat is determined, and a third electrode that forms an electric field together with the first and the second electrodes therebetween in an occupant determination mode in which an occupant in the seat is determined;

an occupant detection electronic control unit tat determines whether the seat is wet based on an output of the capacitance type sensor in the wetness determination mode, and determines an occupant in the seat based on an output of the capacitance type sensor in the occupant determination mode; and a switch circuit that switches between the wetness determination made and the occupant determination mode, wherein:

the first electrode has a larger area than the second electrode;

the switch circuit electrically connects the first electrode with the second electrode such that the fast and the second electrodes are set to the same potential in the occupant determination mode: and the switch circuit electrically connects the first electrode with the third electrode such that the first and the third electrodes are set to the same potential in the wetness determination mode.

* * * * *